INVENTOR.
JOSEPH A. MAS

United States Patent Office 3,453,520
Patented July 1, 1969

3,453,520
LOW DIRECT VOLTAGE TO HIGH DIRECT VOLTAGE CONVERTER
Joseph A. Mas, Woodbury, N.Y., assignor to Dynamic Instrument Corp., Plainview, N.Y., a corporation of New York
Filed Dec. 22, 1965, Ser. No. 515,542
Int. Cl. H02m 3/22, 5/40; H03k 3/28
U.S. Cl. 321—2                    8 Claims

ABSTRACT OF THE DISCLOSURE

A converter circuit having a pair of transistors adapted to function as automatic switches to complete circuits for supplying current from a direct-current source to a portion of a transformer winding. Each transistor is provided with a feedback circuit consisting of a parallel connected diode and resistor.

---

This invention relates to a power supply system and more particularly to a power supply converter for transforming a low direct current potential to a higher direct current potential.

In many applications, such as portable power tools, it is necessary to provide an economical and light weight electrical power supply operable by battery power. Such portable power tools are often required to generate up to 3 H.P. in a transient load application, and this power requirement presents a formidable problem to the design of a compact and efficient low voltage D.C. power supply to drive such loads.

Presently employed power supplies for portable power tools, comprising known transistorized inverters and converters, suffer from the disability that these inverters or converters tend to collapse under the starting surges of current which are ordinarily required for starting under load, causing the power tool to stall. In attempting to meet the problem of developing and sustaining the required starting torque under load, various methods have been employed, with imperfect results, for combining voltage and current feed to drive the transistors. Moreover, such configurations typically require the use of a feedback transformer in addition to the main power transformer thus adding to the cost and weight of the power supply, which are two serious disadvantages. Additionally, in such systems, the main power transformer, in order to accommodate the large starting current surges, must have a power rating greater than the nominal rating otherwise required for normal operation after starting. A further inherent disadvantage in currently used power supply systems is the waste of power due to the fact that the transistors will be active and hence drawing power during no load conditions.

It is therefore an object of the present invention to provide an improved, economical and light-weight D.C. to D.C. converter.

Another object of the present invention is the provision of transistorized D.C. to D.C. converter wherein the driving current to the transistors is directly determined by the load current.

A further object of the present invention is the provision of a D.C. to D.C. converter wherein said converter draws substantially no current at no load condition.

Another object of the present invention is the provision of a D.C. to D.C. converter capable of being rendered operative and inoperative in response to the corresponding application thereto and removal of a load therefrom without the use of relays or additional ON-OFF switches.

Another object of the present invention is the provision of a D.C. to D.C. converter having an improved output efficiency characteristic wherein the D.C. output voltage includes the D.C. source voltage.

In accordance with the principles of the present invention there is provided a converter circuit comprising first and second transistors, a D.C. source of potential, a load and transformer having primary and secondary winding. Means are provided for serially connecting the emitter to collector paths of the first and second transistors with the D.C. potential source and the primary winding. Bias means are connected between the respective base to emitter terminals of the said transistors with first and second feedback circuits serially interconnecting the secondary winding output with said first and second bias means respectively. Means are provided for interconnecting the load between one of said D.C. source output terminals and the secondary winding output such that the load is alternately rendered in series arrangement with said first and second feedback circuits in accordance with the conduction state of the first and second transistors respectively thereby reconciling the base to emitter drive of said transistors with the load current.

The feature of the invention which are believed to be novel are set forth with particularity in the appended claims. The invention, itself, however, both as to its organization and method of operation, together with further objects and features thereof may best be understood by reference to the following description taken in conjunction with the accompanying drawings wherein—

Figure 1:
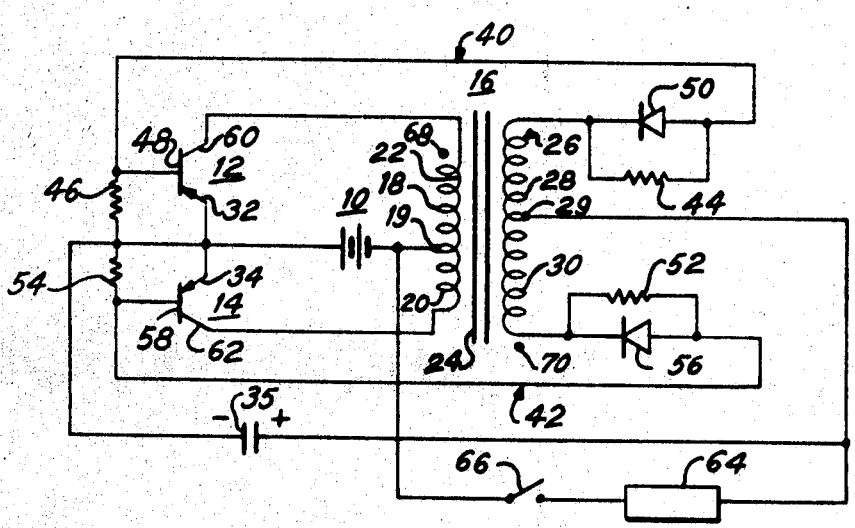
FIG. 1 is a schematic diagram of a D.C. to D.C. converter in a preferred embodiment of the present invention.

Referring to FIG. 1 there is shown a D.C. potential source 10 and a pair of transistors 12 and 14 which function as automatic switches to complete circuits for supplying current from source 10 to transformer 16 at portions 18 and 20 of its primary winding 22. Transformer 16 includes a core 24 of saturable magnetic material having a high permeability and may further possess a substantially rectangular hysteresis loop for improved saturation characteristics. Primary winding 22, comprising winding portions 18 and 20 defined by center tap 19, and secondary winding 26, comprising winding portions 28 and 30 defined by center tap 29, are wound on core 24.

Emitters 32 and 34 of transistors 12 and 14 respectively are tied together at the positive terminal of source 10 and collectors 60 and 62 of transistors 12 and 14 respectively are connected to the end terminals of primary winding 22. The load current, which flows alternately through secondary winding portions 28 and 30, is suitably fed back through a pair of feedback circuits at 40 and 42 to switching transistors 12 and 14 respectively to provide drive thereto. One of the aforementioned feedback circuits 40 includes serially connected resistors 44 and 46 having the junction thereof connected to base 48 of transistor 12, with resistors 44 and 46 connected at their respective other ends to secondary winding portion 28 (at its end remote from tap 29) and emitter 32 respectively. Diode 50 is suitable poled having its cathode connected to portion 28 (at its end remote from tap 29) and its anode connected to base 48 so that the bulk of the peak inverse voltage which appears across resistors 44 and 46 is sustained by rectifying diode 50 in the usual manner. The other feedback circuit 42 has a configuration which is identical to the one described above, and comprises serially arranged resistors 52 and 54, and rectifying diode 56 interconnecting the outer end of secondary winding portion 30 and base 58. Collectors 60 and 62 of transistors 12 and 14 are respectively connected to the outer ends of primary winding portions 18 and 20. Load 64 and switch 66 in series therewith interconnect center taps 19 and 29 of windings 22 and 26 respectively.

Transistors 12 and 14 function as automatic switches to alternately complete the series circuit for supplying current from source 10 to primary winding portions 18 and 20 respectively, and the feedback circuits 40 and 42 are employed to control the switching time of transistors 12 and 14. When switch 66 is closed to start operation, load 64 is thereby connected to output winding 26 at one end and the negative terminal of battery source 10 at the other end. Since the aforementioned feedback circuits are of the current feedback type and the transistor switching circuits therefore inherently self-starting, assume that upon closing switch 66 to complete the load current circuit, transistor 12 will conduct. The starting current supplied by source 10, which is caused to flow only upon the closing of switch 66, passes through source 10, the emitter to base conduction path of transistor 12, resistor 44 and diode 50, secondary winding portion 28, load 64, switch 66 and thence to the negative terminal of source 10 thus completing the load circuit. As transistor 12 thus goes deeper into the conduction region, transformer 16, which is thereby energized, causes higher voltages to be produced across its secondary winding 26. The voltage thus produced across secondary winding portion 28 is applied across the base to emitter junction of transistor 12 by means of resistors 44 and 46 to drive transistor 12 into saturation while the oppositely poled voltage produced across secondary winding portion 30 is applied across the base to emitter junction of transistor 14 by means of resistors 52 and 54 to drive transistor 14 further into the cut-off region, in accordance with the relative polarity of windings 22 and 26 as indicated by the dot notation 68 and 70. An essential feature of the present invention is thus demonstrated in that the magnitude of the base to emitter drive applied to transistors 12 and 14 to control the level of conductivity thereof, is directly determined by the current flowing through load 64 since the load current flows through the base to emitter path of transistors 12 and 14 respectively throughout the above operation.

As the conduction level of transistor 12 increases, the emitter to collector current through transistor 12 will continue to flow through winding portion 18 until core 24 saturates. At saturation, since no further voltage is induced in secondary winding 26, the feedback current falls to zero causing transistor 12 to be rendered non-conductive and transistor 14 to be biased into conduction. Transistor 14 will operate in a manner similar to that of transistor 12 as described above, thereby establishing a cycle of alternate conduction of transistors 12 and 14 having a period determined by the saturation characteristics of saturable transformer 16. Capacitor 35, connected between the positive terminal of source 10 and center tap 29, is operative by virtue of its stored charge to supply load 64 during the period when transistors 12 and 14 are switching from the saturation to the open state and to further reduce the current handled by transistors 12 and 14 during switching period.

When switch 66 is opened to disconnect load 64, the load current and hence the drive to transistors 12 and 14 are interrupted, thereby keeping both transistors in a nonconductive state and drawing virtually no current from battery source 10. The above described operation demonstrates an important feature of the present invention, whereby there is provided a highly efficient D.C. to D.C. converter which draws battery power only under load while having the properties of automatic starting and stopping as well as automatic control of transistor drive without the use of either feedback windings, additional transistors or relays.

Figure 2:
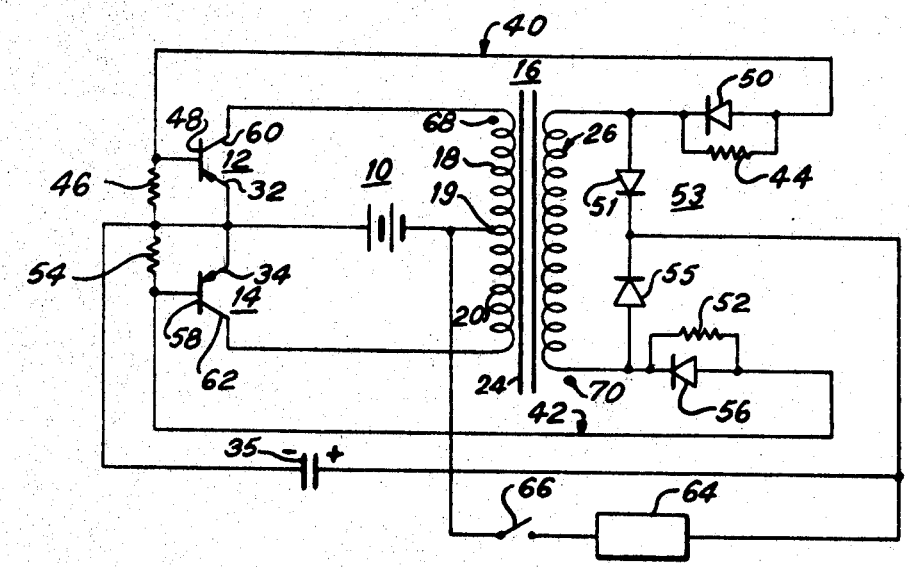
FIG. 2 is a schematic diagram of the preferred embodiment of FIG. 1 in a bridge rectifier configuration.

FIGURE 2 shows an embodiment of the present invention in the bridge rectifier configuration which is operative in a manner similar to that of the full wave rectifier configuration shown in FIGURE 1. The apparatus of FIGURE 2 is similar in configuration and operation to that of FIGURE 1 with the exception of diodes 51 and 55 which are connected back to back between the cathodes of rectifying diodes 50 and 56 respectively to form a bridge rectifier circuit 53, and the fact that load 64 is connected to the junction of diodes 51 and 55 which is an output terminal of bridge rectifier circuit 53. Accordingly, the components of the bridge rectifier circuit in FIGURE 2 have been given identification numerals similar to the corresponding components in FIGURE 1. It is understood that the apparatus of FIGURE 2 is operative in accordance with the principles of the present invention, as described above with respect to the embodiment of FIGURE 1, with the exception of bridge rectifier circuit 53 whose operation is well known in the art and hence need not be recited herein.

Figure 3:
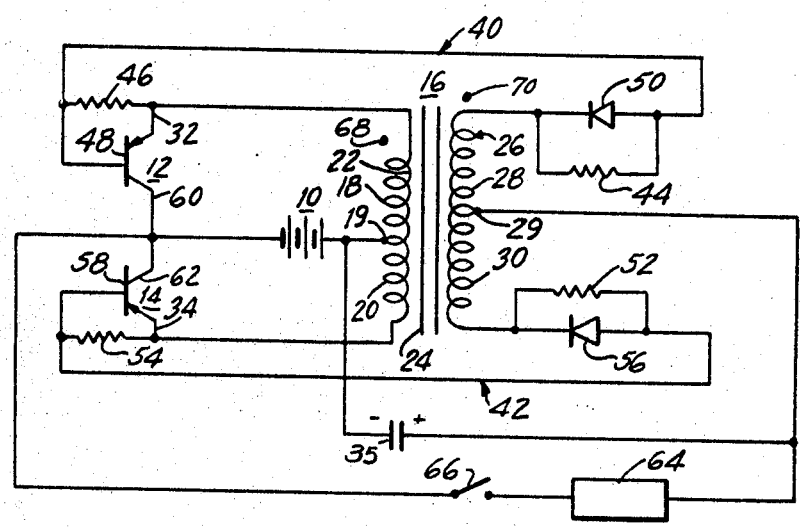
FIG. 3 is a schematic diagram of a D.C. to D.C. converter in the common collector configuration embodying the principles of the present invention.
Figure 4:
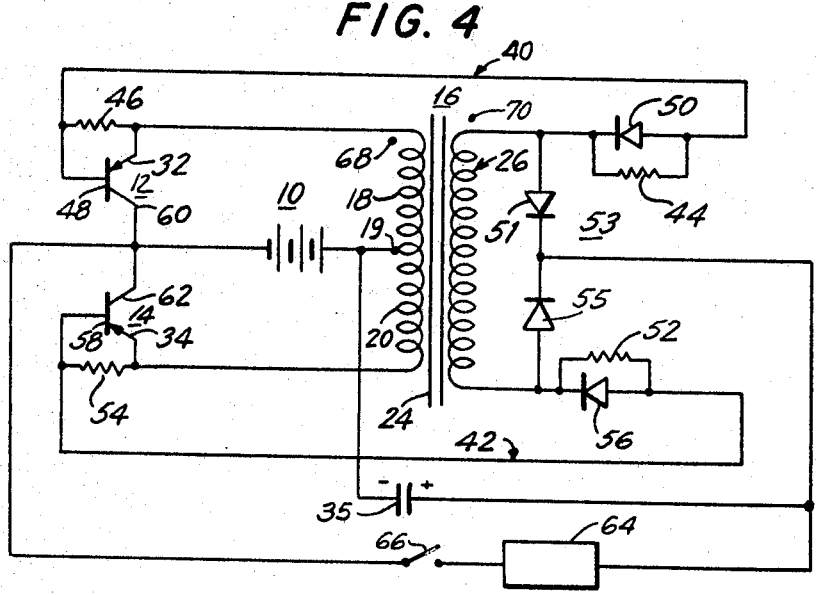
FIG. 4 is a schematic diagram of the embodiment of FIG. 3 in the bridge rectifier configuration.

FIGURES 3 and 4 depict the common collector embodiments of the present invention which correspond respectively to the preferred embodiments shown in FIGS. 1 and 2 respectively. It will be seen upon comparison of FIGS. 3 and 4 with FIGS. 1 and 2 respectively that the corresponding configurations are generally similar in their essential aspects to accordingly embody the principles of the present invention. It will be noted when comparing FIGS. 3 and 4 with FIGS. 1 and 2, that transistors 12 and 14 are arranged in a common collector configuration having collectors 60 and 62 connected together at the negative terminal of D.C. source 10 so that, accordingly, the polarity of source 10 is reversed. Resistors 46 and 54, which are operative to provide the proper feedback drive to transistors 12 and 14 respectively, are again connected between emitter 34 and base 58 respectively. In accordance with the reversal of polarity of source 10, capacitor 35, in FIGS. 3 and 4, is connected at its negative terminal to the positive, rather than the negative, terminal of D.C. source 10.

As in the configurations of FIGS. 1 and 2, transistors 12 and 14 in the circuits of FIGS. 3 and 4 function as automatic switches to alternately complete the series circuit for supplying current from source 10 to primary portions 18 and 20 respectively and feedback circuits 40 and 42 are employed to control the switching time of transistors 12 and 14 respectively. In FIG. 3, assume that upon closing switch 66 to complete the load current circuit, transistor 12 will conduct. The starting current passes through source 10, primary winding portion 18, the emitter to base conduction path of transistor 12, resistor 44 and diode 50, secondary winding portion 28, load 64 and thence to the negative terminal of source 10 thus completing the load circuit. As transistor 12 goes deeper into conduction, the increased voltage produced across secondary winding portion 28 is applied across the base to emitter junction of transistor 12 by means of resistors 44 and 46 to drive transistor 12 into saturation while the oppositely poled voltage produced across secondary winding portion 30 is applied by means of resistors 52 and 54, across the base to emitter junction of transistor 14 to drive transistor 14 farther into the cut-off region in accordance with dot notation 68 and 70. Thus, in a manner similar to that of the circuits of FIGS. 1 and 2, in FIG. 3 the magnitude of the base to emitter drive applied to transistors 12 and 14 to control the level of conductivity thereof is directly determined by the current flowing through load 64.

The converter circuit of FIG. 3 is operative in a manner similar to that of FIG. 1 as described hereinabove to establish a cycle of alternate conduction of transistors 12 and 14 having a period determined by the saturation characteristics of saturable transformer 16. Capacitor 35 is operative by virtue of its stored charge to supply load 64 during the switching interval of transistors 12 and 14 and to further reduce the current handled by transistors 12 and 14 during such switching period.

FIG. 4 shows an embodiment of the present invention in the bridge rectifier configuration which is operative in a manner similar to that of the full wave configuration of FIG. 3. It is understood that the circuit of FIG. 4 is operative, in accordance with the principles of the present invention, as described above with respect to the embodiment of FIG. 3, with the exception of bridge rectifier circuit 53 whose operation is well known in the art and hence is not detailed herein. Accordingly, reference is made to the description presented hereinabove with respect to the operation of the embodiments of FIGS. 2 and 3 to provide adequate explanation of the operation of the embodiment of FIG. 4.

An important result of the novel features of the converter circuits of FIGS. 1–4 as described above, resides in their particular usefulness when applied to power tools having transient loads such as power drills and saws which run off battery power. Presently used portable power tools generally have to develop up to 3 horsepower to perform their intended task. The presently used "cordless" type electric drills, however, which are designed for low voltage D.C. operation develop only a very limited torque which seriously restricts their application. Although the use of transistor inverters has been relied upon to overcome the problems inherent in transient type loads, these efforts have been largely unsuccessful since transistorized inverters and converters in the known configurations tend to collapse under the large starting current surges which are required for sufficient starting torque. Furthermore, such transistorized converters generally require an additional transformer in addition to the main power transformer, for driving the switching transistors, and the power transformer itself must have a sufficiently high rating to accommodate the large starting power. A further disadvantage of such presently used devices lies in the fact that the converter or inverter circuits employed therein are energized and drawing battery current at no load thus seriously impairing the circuit efficiency. These serious limitations, inherent in the presently used converter and inverter circuits, are conspicuously absent in the embodiments of the present invention as shown in FIGURES 1–4 wherein the transistor drive is directly determined by the load current. Furthermore, by virtue of the novel feedback circuits and load connection configurations shown in FIGURES 1–4, the converter circuit's output voltage is not restricted by the transistor inverse voltage ratings and hence is virtually unlimited.

A further advantageous feature of the embodiments of the present invention as described herein, is that they allow the use of high transistor switching frequencies thus keeping the size of the power transformer extremely low and thereby conserving bulk and weight. For example, a conventional converter circuit typically utilizes a power transformer having a 1″ stack of 1″ laminations which, when operating at 60 c.p.s. would produce a power output of approximately 30 volt amperes. The same size transformer, however, if employed in the embodiment of the present invention, is capable of powering a 5 ampere-120 volt power tool having a running load of 600 volt amperes.

Still another advantage of the embodiments presented herein lies in the returning of the load to the negative terminal of the battery source in the configurations of FIGS. 1 and 2 and to the positive terminal thereof in the configurations of FIGS. 3 and 4, thus adding the battery voltage to the output voltage provided by the secondary winding, to further increase the converter circuit efficiency.

While there have been shown particular embodiments of the present invention, it will be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. A direct-current converter circuit for application with loads having high power and current surge characteristics comprising first and second transistors, a source of unidirectional potential having a pair of output terminals, a load, a saturable transformer having primary and secondary windings with said primary winding having at least first and second portions and said secondary winding having a pair of end terminals, means serially connecting the emitter to collector path of said first transistor with said potential source and said first portion of said primary winding, means serially connecting the emitter to collector path of said second transistor with said potential source and said second portion of said primary winding, first bias means connected between the base and emitter of said first transistor, a first feedback circuit having a first resistor interconnecting one of said secondary winding end terminals and said base of said first transistor, and a first diode connected across said first resistor, second bias means connected between the base and emitter of said second transistor, a second feedback circuit having a second resistor interconnecting the other of said secondary winding end terminals and said base of said second transistor, and a second diode connected across said second resistor and means interconnecting said load with one of said potential source output terminals and said secondary winding, whereby the drive alternately applied between the base and emitter of said first and second transistors respectively is determined by the current through said load, said first and second diodes being suitably poled whereby the magnitude of said source potential and load potentials are not limited by the inverse voltage ratings of said second transistor.

2. A direct-current converter circuit for application with loads having high power and current surge characteristics comprising first and second transistors, a source of unidirectional potential having a pair of output terminals, a load, a saturable transformer having primary and secondary windings with said primary and secondary windings each having a pair of end terminals and at least first and second portions, means serially connecting the emitter to collector path of said first transistor with said potential source and said first portion of said primary winding, means serially connecting the emitter to collector path of said second transistor with said potential source and said second portion of said primary winding, first bias means connected between the base and emitter of said first transistor, a first feedback circuit having a first resistor interconnecting one of said secondary winding end terminals and said base of said first transistor, and a first diode connected across said first resistor, second bias means connected between the base and emitter of said second transistor, a second feedback circuit having a second resistor interconnecting the other of said secondary winding end terminals and said base of said second transistor, and a second diode connected across said second resistor and bidirectional and substantially impedance free means interconnecting said load with one of said potential source output terminals and the junction of said first and second secondary winding portions, such that said load is alternately rendered in series arrangement with said first and second feedback circuits in accordance with the conduction state of said first and second transistors respectively, whereby the drive alternately applied between the base and emitter of said first and second transistors respectively is determined by the current through said load, said first and second diodes being suitably poled whereby the magnitude of said source potential and load potentials are not limited by the inverse voltage ratings of said second transistor.

3. A converter circuit as defined in claim 2 wherein there is further included a capacitor connected between the other of said potential source output terminals and one end of said load.

4. A converter circuit as defined in claim 3 wherein said first bias means comprises a third resistor connected between the base and emitter of said first transistor and said second bias means comprises a fourth resistor connected between the base and emitter of said second transistor.

5. A direct-current converter circuit for application with loads having high power and current surge characteristics comprising first and second transistors, a source of unidirectional potential having a pair of output terminals, a load, a saturable transformer having primary and secondary windings with said primary winding having first and second portions and said secondary winding having a pair of end terminals, means serially connecting the emitter to collector path of said first transistor with said potential source and said first portion of said primary winding, means serially connecting the emitter to collector path of said second transistor with said potential source and said second portion of said primary winding, first bias means connected between the base and emitter of said first transistor, a first feedback circuit having a first resistor interconnecting one of said secondary winding end terminals and said base of said first transistor, and a first diode connected across said first resistor, second bias means connected between the base and emitter of said second transistor, a second feedback circuit having a second resistor interconnecting the other of said secondary winding end terminals and said base of said second transistor, and a second diode connected across said second resistor, bridge rectifying means connected across said secondary winding end terminals, said bridge rectifying means including said first and second diodes, and bidirectional and substantially impedance free means interconnecting said load between said bridge rectifying means and one of said potential source output terminals such that said load is alternately rendered in series arrangement with said first and second feedback circuits in accordance with the conduction state of said first and second transistors respectively, whereby the drive alternately applied across the base to emitter paths of said first and second transistors respectively is determined by the current through said load, said first and second diodes being suitably poled whereby the magnitude of said source potential and load potentials are not limited by the inverse voltage ratings of said second resistor.

6. A converter circuit as defined in claim 5 wherein there is further included a capacitor connected between the other of said potential source output terminals and one end of said load.

7. A converter circuit as defined in claim 6 wherein said first bias means comprises a third resistor connected between the base and emitter of said first transistor and said second bias means comprises a fourth resistor connected between the base and emitter of said second transistor.

8. A converter circuit as defined in claim 7 wherein said bridge rectifier means further includes third and fourth diodes poled in a serial back to back arrangement said diode arrangement being connected across said secondary winding end terminals, said load being connected to the junction of said third and fourth diodes.

References Cited

UNITED STATES PATENTS

| | | | |
|---|---|---|---|
| 3,383,624 | 5/1968 | Fiala | 321—2 X |
| 3,149,291 | 9/1964 | Massey | 321—2 X |
| 3,159,800 | 12/1964 | Massey | 321—2 X |
| 3,213,346 | 10/1965 | King | 321—2 |
| 3,297,934 | 1/1967 | Massey | 321—2 |

FOREIGN PATENTS

| | | |
|---|---|---|
| 994,808 | 6/1965 | Great Britain. |
| 222,762 | 8/1962 | Austria. |

OTHER REFERENCES

Electronic Industries, "Designing a Low-Cost Power Supply," pp. 188–189, April 1962.

JOHN F. COUCH, Primary Examiner.

W. H. BEHA, Jr., Assistant Examiner.

U.S. Cl. X.R.

331—113